United States Patent
Bobrowsky et al.

[11] 3,815,332
[45] June 11, 1974

[54] GAS SCRUBBER AND METHOD
[75] Inventors: Charles A. Bobrowsky, Rego Park; Joseph A. Loise, Queens Village, both of N.Y.
[73] Assignee: Double B Construction & Incinerator Upgrading Co., Inc., Brooklyn, N.Y.
[22] Filed: Mar. 28, 1972
[21] Appl. No.: 238,767

[52] U.S. Cl............... 55/223, 55/227, 55/244, 261/119 R, 261/DIG. 54
[51] Int. Cl............................................ B01d 47/02
[58] Field of Search............ 55/223, 227, 244, 249, 55/256, 260, 443, 444, 255; 261/119 R, DIG. 54

[56] References Cited
UNITED STATES PATENTS

| | | | |
|---|---|---|---|
| 809,383 | 1/1906 | Lowe | 261/DIG. 54 X |
| 1,363,331 | 12/1920 | Livermore | 55/244 |
| 2,484,277 | 10/1949 | Fisher | 261/DIG. 54 X |
| 3,553,943 | 1/1971 | Sharpe | 55/223 |
| 3,624,696 | 11/1971 | Cohen et al. | 261/119 R X |
| 3,673,769 | 7/1972 | Gleason | 55/223 |

Primary Examiner—Frank W. Lutter
Assistant Examiner—William Cuchlinski, Jr.
Attorney, Agent, or Firm—Burgess, Dinklage & Sprung

[57] ABSTRACT

A gas scrubber is disclosed and includes a housing which contains a water bath and a pair of spaced apart baffle means which extend below the level of the water bath at their lower ends and divide the interior of the housing above the water bath into a receiving zone, a turbulent zone and a discharge zone. A third baffle means extends from the bottom of the housing and ends above the level of the water bath between the pair of baffle means. The arrangement of the housing and baffle means in connection with the water bath is such that gas containing entrained solids is passed through the scrubber in a tortuous path in and out of the water bath resulting in removal of solids entrained in the gas and a discharge of substantially clean gas.

5 Claims, 3 Drawing Figures

PATENTED JUN 11 1974  3,815,332
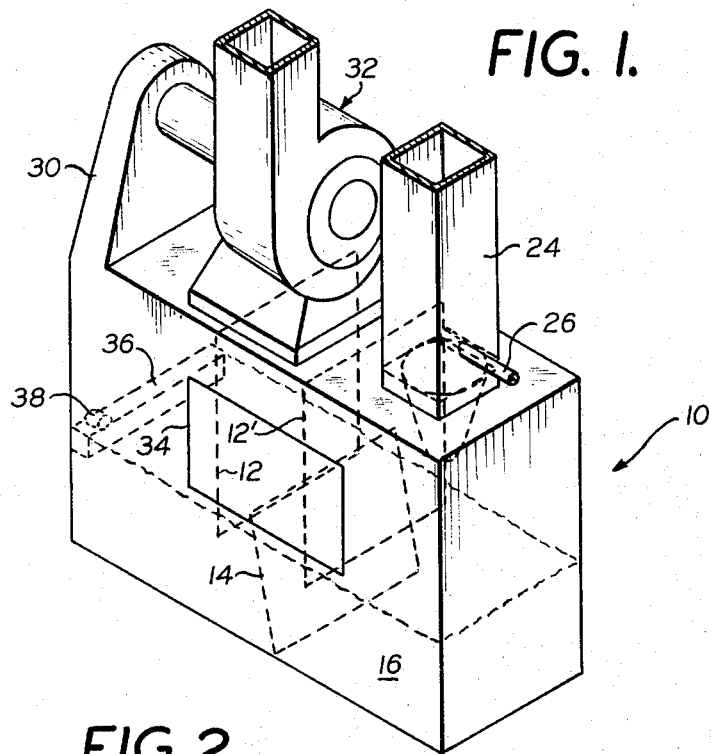
FIG. 1.
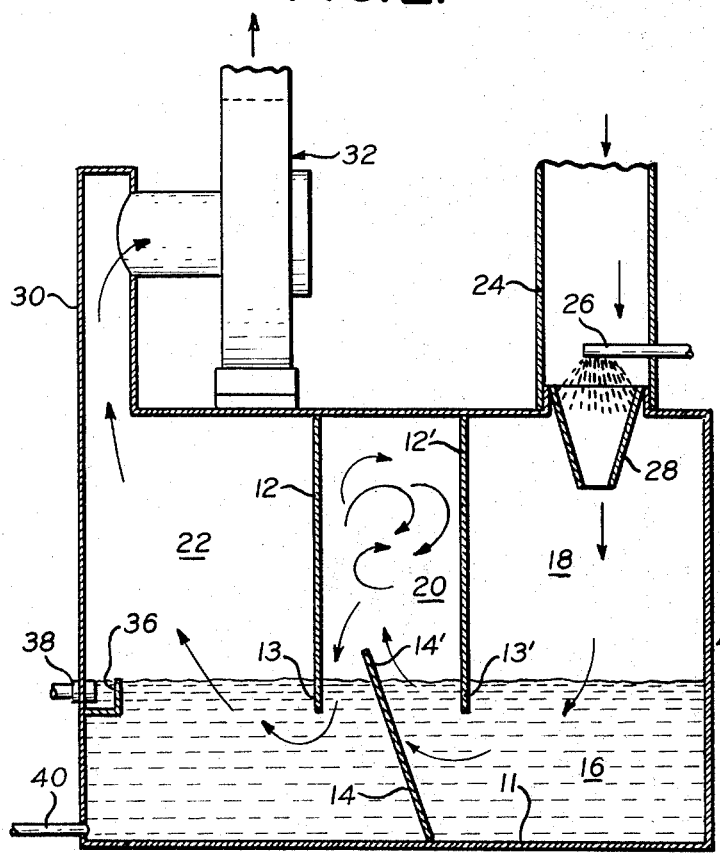
FIG. 2.
FIG. 3.

3,815,332

GAS SCRUBBER AND METHOD

BACKGROUND

This invention relates to gas scrubber apparatus and a process for removing entrained solids from a gas stream. More particularly, this invention relates to a gas scrubber which is particularly suited for removing entrained solids from incinerator smoke so that clean gas having a solids content below prescribed limits can be safely discharged into the atmosphere.

Gas scrubbers for removing entrained solids from a gas stream are known. Such devices for separating solids from a gas stream include dust collectors, such as cyclones, water sprayer (for example as disclosed in U.S. Pat. No. 3,054,244) and other liquid-gas washers. However, none of these devices have been found to be entirely satisfactory.

Another gas scrubber device proposed involves a series of baffles in a housing which contains a water bath. The baffles extend below the level of the water and divert gases passing through the water bath causing them to exit therefrom. This arrangement, however, is far from satisfactory because the gas, once having left the water bath, must once again enter the water bath and pass under the same baffle that causes the gas to leave the water bath. These conflicting functions seriously affect the efficiency of this type of device.

The present invention provides a gas scrubber which broadly includes a housing containing a water bath, a pair of spaced apart baffle means extending below the level of the water bath at their lower ends and dividing the interior of the housing above the water bath into a receiving zone, a turbulent zone and a discharge zone, and a third baffle means extending from the bottom of the housing and ending above the level of the water bath between the pair of baffle means.

In a preferred embodiment, the scrubber housing includes a gas inlet in the receiving zone and a gas outlet in the discharge zone, the inlet and the outlet both being above the level of the water bath. Another preferred embodiment involves water spray means associated with the gas inlet for wetting solids entrained in gas entering the receiving zone and for maintaining the water bath at a predetermined level.

Further embodiments include overflow drain means in the discharge zone and suction means associated with the gas outlet adapted to draw gas in a tortuous path in and out of the water bath through the scrubber.

The present invention also provides a process for removing solids entrained in a stream of gas which comprises passing the stream of gas through a scrubbing zone which is divided into a water bath with receiving, turbulent, and discharge zones thereabove, the gas stream being caused to travel in a tortuous path in and out of the water bath and sequentially through said receiving, turbulent and discharge zones.

DESCRIPTION OF THE DRAWING

The present invention will be more fully understood by reference to the accompanying drawing wherein:

FIG. 1 is an isometric view of a preferred gas scrubber according to the invention;

FIG. 2 is a side elevational view in cross-section of the gas scrubber of FIG. 1; and FIG. 3 is a perspective view partially broken away illustrating means for adjusting the height of the pair of baffle means which extend into the water bath at their lower end.

DESCRIPTION

Referring now to the drawing and in particular to FIGS. 1 and 2, the gas scrubber according to the invention for removing solids entrained in a stream of gas is shown to include rectangular housing 10 which contains water bath 16. A pair of baffles 12 and 12' are positioned in the upper portion of the housing 10 and extend below the level of the water bath 16 at their respective lower ends 13 and 13'.

A third baffle 14 extends from the bottom 11 of the housing 10 and ends at 14' above the level of the water between the baffles 12 and 12' preferably approximately midway therebetween or closer to baffle 12. As can be seen from FIGS. 1 and 2, the baffles 12, 12' and 14 extend across the width of housing 10 transverse to the direction of flow through the scrubber.

The baffles 12 and 12' divide the interior of the housing 10 above the water bath 16 into a receiving zone 18, a turbulent zone 20 and a discharge zone 22. These three zones are isolated from one another but communicate via the water bath 16 with the aid of baffles 12, 12' and 14.

Baffle 14 is preferably inclined towards the discharge zone 22 to promote entry of gas passing through the water bath from receiving zone 18 into turbulent zone 20.

A gas inlet 24 feeds a gas stream containing entrained solids into the receiving zone 18 and is preferably provided with a cone-shaped inlet 28 which extends into the receiving zone 18.

A water spray means 26 is associated with the gas inlet 24 and functions to wet solids entrained in the gas stream entering the receiving zone 18 and also maintains the level of the water bath 16 at a predetermined level.

Overflow drain 36 is provided in the discharge zone 22 and is preferably a channel member which extends across the width of the scrubber. A coupling 38 is conveniently used to remove the water from the overflow drain 36. The overflow drain 36 functions to remove water with solids retained in the water bath by contact with the gas stream with entrained solids. A drain 40 can also be conveniently provided at the bottom of the water bath in the housing 10 to periodically drain the scrubber forward of the baffle 14. A similar drain can be provided at the opposite end of the scrubber.

Outlet 30 for scrubbed gas is in communication with discharge zone 22. A suction device such as a blower 32 is attached to the gas outlet 30 and is adapted to draw gas in a tortorous path in and out of the water bath 16 through the scrubber. Other similar devices known for this purpose can also be employed to draw gas through the scrubber. It should also be understood that if desired the motive force causing the gas to flow through the scrubber can be applied at the gas inlet 24 in addition to or in place of a drawing device at the gas outlet 30.

In FIG. 3, baffle 12 is shown separated from its lower end 13 each having matching grooves 42 and 44. Portions 12 and 13 can be conveniently bolted to one another using bolt and nut assembly 45–46. The embodiment shown in FIG. 3 allows vertical adjustment with respect to the position of the lower ends of the baffles 12 and 12', to position same, the desired distance below the level of the water bath 16. In general, the baffles 12 and 12' extend from 1 to 2 inches below the level of the water bath 16 and the baffle 14 extends from 1 to 3 inches above the level of the bath 16. To obtain more vigorous scrubbing action, the lower ends 13 and 13' of baffles 12 and 12' are positioned further into the bath 16. The baffle 14 preferably is inclined at an angle of from 20° to 40° from the vertical.

As shown in FIG. 1, a door 34 may be provided to gain access to the interior of the scrubber. The door 34 may also include a window for observing the scrubbing action taking place in the scrubber.

In operation, a gas stream containing entrained solids such as raw incinerator smoke enters receiving zone 18 from gas inlet 24 via cone 28. Water spray from 26 wets solid particles in the gas stream which is promoted by causing the water and gas to converge in cone 28 before entering zone 18. The gas stream is then drawn from zone 18 into water bath 16 under baffle 12' and into zone 20 with the aid of baffle 14. The turbulent action in this zone promotes further wetting of entrained solids and causes them to be retained in the water bath. From zone 20 the gas stream again enters the water bath 16, passes under baffle 12 into discharge zone 22 and the cleaned gas exits through outlet 30 by means of blower 32. In practice, the solids that are retained by the water bath migrate to the discharge zone 32 and most float on the top of the bath and are conveniently removed from the surface through overflow drain 36. Those solids that sink to the bottom can be removed as sludge via drain 40.

What is claimed is:

1. Gas scrubber for removing solids entrained in a stream of gas comprising a housing having a bottom, side walls and a top and containing a water bath, a pair of spaced apart baffle means extending down from the top of the housing to below the level of the water bath at their lower ends and dividing the interior of said housing above the water bath into a receiving zone, a turbulent zone and a discharge zone, and third baffle means extending from the bottom of the housing and inclined at an angle of from 20°–40° from the vertical toward said discharge zone and ending just above the level of the water bath at a point approximately midway between said pair of baffle means, said inclined baffle means directing entry of gas passing through said water bath from said receiving zone into said turbulent zone, said turbulent zone existing between said pair of baffle means and said housing and promoting further wetting of entrained solids causing them to be retained in said water bath, and suction means adapted to draw gas in a tortuous path in and out of said water bath and through said zones.

2. Gas scrubber for removing solids entrained in a stream of gas comprising a housing having a bottom, side walls and a top and containing a water bath, a pair of spaced apart baffle means extending down from the top of the housing to just below the level of the water bath at their lower ends and dividing the interior of said housing above the water bath into a receiving zone, a turbulent zone and a discharge zone, third baffle means inclined toward said discharge zone, third baffle means inclined toward said discharge zone and extending from the bottom of the housing and ending just above the level of the water between said pair of baffles, a gas inlet in the receiving zone and a gas outlet in the discharge zone, said inlet and said outlet being above the water bath, water spray means associated with the gas inlet for wetting solids entrained in gas entering the receiving zone and for maintaining said water bath at a predetermined level in conjunction with overflow drain means in said discharge zone, suction means associated with the gas outlet adapted to draw gas in a tortuous path in and out of said water bath and through said zones, said third baffle means directing entry of gas passing through said water bath from said receiving zone into said turbulent zone, said turbulent zone existing between said pair of spaced apart baffle means and said housing and promoting further wetting of entrained solids causing them to be retained in said water bath.

3. Scrubber of claim 2 wherein said gas inlet is cone-shaped and extends into said receiving zone.

4. Scrubber of claim 2 wherein said pair of baffle means are parallel to each other.

5. Scrubber of claim 2 wherein said housing is rectangular and said baffle means are substantially perpendicular to the longitudinal axis thereof.

* * * * *